United States Patent [19]

Strott et al.

[11] Patent Number: 4,876,899
[45] Date of Patent: Oct. 31, 1989

[54] TORQUE SENSING DEVICE

[75] Inventors: Douglas B. Strott, Attleboro; Keith W. Kawate, Attleboro Falls, both of Mass.

[73] Assignee: Texas Instruments Incorporated, Dallas, Tex.

[21] Appl. No.: 264,754

[22] Filed: Oct. 31, 1988

[51] Int. Cl.[4] .............................................. G01L 3/10
[52] U.S. Cl. .............................................. 73/862.33
[58] Field of Search ............... 73/862.33; 324/208; 336/135; 340/870.35

[56] References Cited

U.S. PATENT DOCUMENTS

| | | | |
|---|---|---|---|
| 2,461,685 | 2/1949 | Godsey, Jr. ................... | 336/135 X |
| 2,470,626 | 5/1949 | Langer et al. .................. | 73/862.33 |
| 2,482,477 | 9/1949 | Gudsey, Jr. .................... | 73/862.33 |
| 4,724,710 | 2/1988 | Murty ............................. | 324/208 X |

*Primary Examiner*—Charles A. Ruehl
*Attorney, Agent, or Firm*—James P. McAndres; John A. Haug; Melvin Sharp

[57] ABSTRACT

A torque sensing device has a torque transmitting member with ends which are relatively rotatable around a member axis in response to an applied torque. Lost motion components rotating with the member ends have portions compactly extending along the member axis to engage the other component to limit such rotation after a predetermined degree of relative rotation has occurred. Two ferromagnetic elements rotating with the respective lost motion components have portions which extend along the member axis into interleaved relation with corresponding portions of the other element to form spaced pairs of respective element portions at each of two sides of a plane which extends transversely across the member axis. The elements respond to relative rotation of the torque transmitting member ends to proportionally increase the spacing in the pairs of element portions at one side of the noted plane and to decrease the spacing in the pairs of element portions at an opposite side of the plane. An exciting coil surrounding the elements induces magnetic leakage flux at the spacing of the pairs of element portions representative of the degree of spacing and a pair of sensing coils disposed around the elements are coupled to that magnetic leakage flux at respective sides of the noted plane. The sensing coils are differentially connected to provide an output signal corresponding to the applied torque.

12 Claims, 4 Drawing Sheets

TORQUE SENSING DEVICE

BACKGROUND OF THE INVENTION

The field of this invention is that of torque sensors and the invention relates more particularly to a compact and reliable torque sensing device particularly adapted for use in an automotive power steering system.

Conventional automotive power steering systems utilize a torque sensing device to detect torque applied to a vehicle steering shaft. They provide a control signal corresponding to the torque for regulating operation of a motor to provide a desired degree of assisting torque to the steering shaft. Similar torque sensors are proposed or used in a variety of other torque measurement and control applications, such sensors including strain gage torque detecting systems, magnetic leakage flux systems, hydraulic systems and the like. In most automotive steering systems presently in use, the torque sensor device includes a torque transmitting member or bar which twists relatively easily under an initially applied torque to provide a control motion and includes lost motion means which engage after a predetermined degree of twist has occurred for reliably transmitting any additional applied torque while also protecting the torque bar from damage. In the typically used automotive steering systems, the degree of twist provided in the torque bar regulates a hydraulic system to provide the desired degree of assisting torque to the steering shaft. However with increased use of computer control of automotive engine systems, there has been increased interest in electrical torque sensing devices using electromagnetic torque detecting means and the like to be more compatible with the computer engine controls. Many of such electrical systems have now been proposed. A torque sensing device using a magnetic leakage flux has been considered desirable in many respects but is also found to be relatively expensive to manufacture and to be relatively sensitive to variations in axial alignment of device components and to other factors which are difficult for a manufacturer to control. It would be desirable if a more reliable and inexpensive electrical torque sensing device could be provided particularly for use in automotive power steering systems.

SUMMARY OF THE INVENTION

It is an object of this invention to provide a novel and improved torque sensing device; to provide an electrical torque sensing device which displays improved accuracy and reliability in use; to provide such a device incorporating a relatively limited number of easily assembled and aligned components; to provide such a device which is easily and economically manufactured; and to provide such a device which is compact and rugged and particularly adapted for use in automotive power steering systems.

Briefly described, the novel and improved torque sensing device of the invention comprises a torque transmitting member or bar which is adapted to receive an applied torque for twisting or rotating one end of the member around a member axis relative to an opposite end of the member to a degree which is representative of the applied torque. Lost motion sleeve components or the like are fitted around and secured to the ends of the torque transmitting member to be compactly accommodated in the device to be relatively rotated with the member ends. Preferably the lost motion sleeve components each have portions extending along the length of the member shaft to engage corresponding portions of the other lost motion sleeve component after a predetermined amount of relative rotation of the torque transmitting member ends has occurred. That engagement substantially limits further twisting of the member to protect the member from damage while also transmitting any additional torque which may be applied to the member.

In accordance with the invention, a pair of ferromagnetic elements are secured to the lost motion sleeve components or the like for rotation with the ends of the torque transmitting member and each element has portions spaced around and extending along the member axis into interleaved relation with corresponding portions of the other ferromagnetic element. The extending element portions are arranged to form pairs of the portions from the respective elements at each of two sides of a plane which extends transversely across the axis of the torque transmitting member. Those pairs of spaced element portions are normally disposed to have a first discontinuity such as a relatively close spacing therebetween and the ferromagnetic elements are arranged to be responsive to rotation of the torque transmitting member ends to proportionally increase the discontinuity or spacing between the pairs of element portions at one side of the noted plane and to proportionally decrease the discontinuity or spacing between the pairs of element portions at the opposite sides of the plane. In that way, the two ferromagnetic elements are easily manufactured and are easily aligned relative to each other to properly provide the desired discontinuities or spacings therebetween. A magnetic field exciting coil is disposed around the extending portions of the ferromagnetic elements and is adapted to be energized to induce a magnetic field in the elements to produce a magnetic leakage flux at the locations of the discontinuities or spaces between the pairs of element portions at either side of the noted plane, the amount of leakage flux being representative of the degree of discontinuity. A pair of sensing coils are also disposed around the extending portions of the elements at respective opposite sides of the noted plane to be coupled to the magnetic leakage flux, the sensing coils being differentially coupled to provide an output signal corresponding to an applied torque.

In one preferred embodiment for example, each ferromagnetic element has a sleeve part press fitted on a lost motion sleeve component. Each element has a first plurality of element portions of a selected length and a second plurality of element portions of relatively greater length spaced in alternate relation to each other around the periphery of the sleeve part to extend along the length of the torque transmitting member axis. The element portions on each element sleeve part are grouped in a plurality of pairs each including one element portion of each length disposed in closely spaced side-by-side relation to each other, there being relatively greater spacing between adjacent pairs of the element portions around the sleeve periphery. In that arrangement, the ferromagnetic elements are adapted to be easily manufactured and mounted with the extending portions of the two elements interleaved to accurately form the desired discontinuities at each side of the noted plane as described above. That is, distal ends of the extending element portions of different length on one ferromagnetic element are disposed in a desired, closely spaced side-by-side relation to the distal ends of respective extending element portions of the other length on the other ferromagnetic element to provide the desired discontinuity spacings as described above, the alternate spacing of the extending element portions of different length serving to provide the plurality of discontinuity spacings at each side of the noted plane in an accurate way. The exciting and sensing coils are also preferably mounted in side-by-side relation on a common bobbin and the bobbin is movably mounted on the ferromagnetic elements by use of bearings to be compactly positioned in closely spaced relation to the noted discontinuities to be coupled to magnetic leakage flux occuring at such discontinuities while also permitting the ferromagnetic elements to undergo relative rotation as noted above. Preferably the bearings are electrically conductive and mount a magnetic shield which extends around the outer surfaces of the coils on the bobbin to facilitate establishment of the desired magnetic field and to shield the coils from extraneous magnetic field effects.

DESCRIPTION OF THE DRAWINGS

Other objects, advantages and details of the novel and improved torque sensing device of this invention appear in the following detailed description of preferred embodiments of the invention, the detailed description referring to the drawings in which.

DESCRIPTION OF THE PREFERRED EMBODIMENTS

Figure 1:
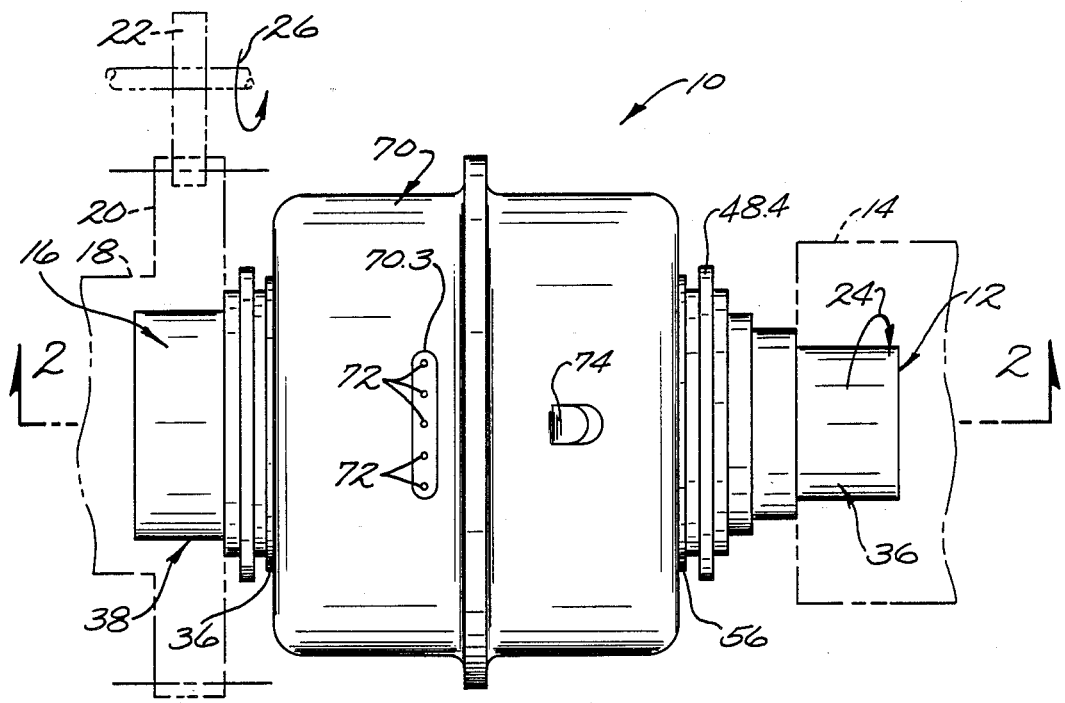
FIG. 1 is a side elevation view of a torque sensing device of the invention.
Figure 2:
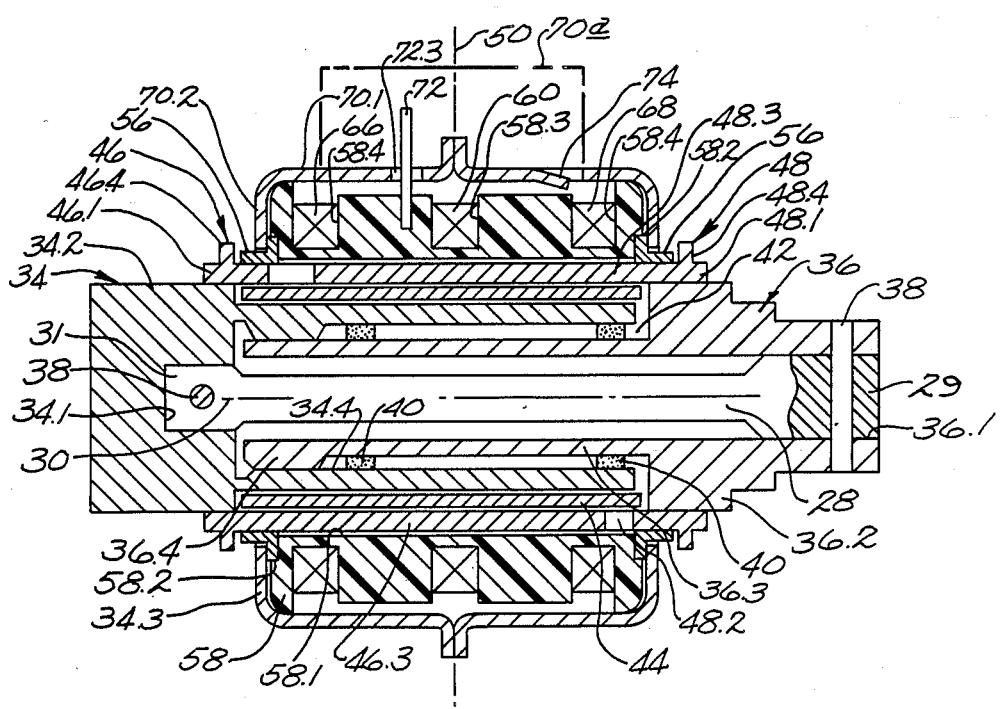
FIG. 2 is a section view along line 2—2 of FIG. 1.

Referring to the drawings, 10 in FIGS. 1 and 2 indicates the novel and improved torque sensing device of this invention which is shown to be connected in an automotive vehicle steering system for example by having one input shaft end 12 of the device connected in any conventional manner to a vehicle steering shaft or the like as diagrammatically indicated by the broken lines 14 in FIG. 1 and by having an opposite or output shaft end 16 of the device connected to a wheel-turning shaft or the like as diagrammatically indicated by the broken lines 18, the output shaft also typically including gear means or the like as indicated at 20 in FIG. 2 adapted to be driven by a motor diagrammatically indicated at 22 in FIG. 1 for providing additional torque to assist in turning the vehicle wheels as will be understood. In that arrangement, the torque sensing device 10 is adapted to sense torque applied to the device by the vehicle steering shaft as indicated by the arrow 24 in FIG. 1 to provide an electrical output signal from the device to regulate operation of the motor to provide a desired assisting torque as indicated by the arrow 26. It should be understood that the torque sensing device of the invention is also adapted for use in other applications within the scope of this invention.

In accordance with the invention the torque sensing device 12 comprises a torque transmitting member or torque bar 28 formed of a suitably strong material such that, when a selected torque or turning force is applied to the input shaft end 29 of the member, the member end rotates around the member axis 30 relative to the opposite end 31 of the member to an extent proportional to or representative of the amount or degree of applied torque. The member is usually but not necessarily made of strong and stiffly resilient metal material such as stainless steel or the like and typically but not necessarily has some ferromagnetic properties.

A pair of lost motion sleeve components 34 and 36 are secured to respective ends of the member 28 to be rotatable with the member ends. Preferably bores 34.1 and 36.1 in the components are fitted closely over the member ends and drive pins 38 or other conventional means secure the components to the member, usually at device assembly. The lost motion sleeve components preferably comprise a sleeve part 34.2, 36.2 and have a plurality of spline portions 34.3, 36.3 or the like spaced around the periphery of the sleeve parts to extend along the axis 30 of the member 28 to interleave with and engage corresponding portions of the other component when the components have undergone a selected degree of rotation relative to each other. Preferably, the extending portions 34.3 are spaced around a first selected diameter of the sleeve part 34.2 and the extending portions 36.3 are spaced around a smaller diameter of the sleeve part 36.2 as shown in FIG. 2 and the spline portions have respective teeth or bosses 34.4, 36.4 adapted to engage each other when opposite ends of the member 28 have rotated to a predetermine degree such as 7°. That engagement then serves to substantially restrict additional relative rotation of the torque transmitting member ends for protecting the member against damage while assuring that any additional applied torque from the shaft 14 is transmitted to the output end 16 of the torque sensing device. In a preferred embodiment, bearings such as permanently lubricated bearings 40 are fitted between the splines or extending portions of the lost motion components to assure smooth device operation. Preferably the splines are positioned to allow a groove area 42 around the splines to accommodate a sleeve 44 of brass or other electrically conductive, nonmagnetic material closely around the splines and the torque transmitting member 28.

A pair of ferromagnetic elements 46, 48 are mounted on respective sleeve components 34, 36 and are secured to the components to be rotatable therewith. Each element is formed of a high permeability magnetic material such as cold rolled steel or Alloy 49 or the like. Alloy 49 having a nominal composition by weight of 49 percent nickel and the balance iron. Preferably the ferromagnetic elements each comprise a sleeve part 46.1, 48.1 fixedly secured to a lost motion sleeve component by a press fit or in other conventional manner and each element has a plurality of portions which are spaced from each other around the axis 30 of the torque transmitting member to extend from the sleeve parts along the member axis into interleaved relation with corresponding extending portions of the other ferromagnetic element. The extending element portions are arranged to form a plurality of pairs of the portions from the respective elements at each of two sides of a plane 50 which extends transversely across the axis 30 between the ends of the torque transmitting member. That arrangement provides selected close spacings or discontinuities between the element portions in those pairs at those locations.

Figure 3:
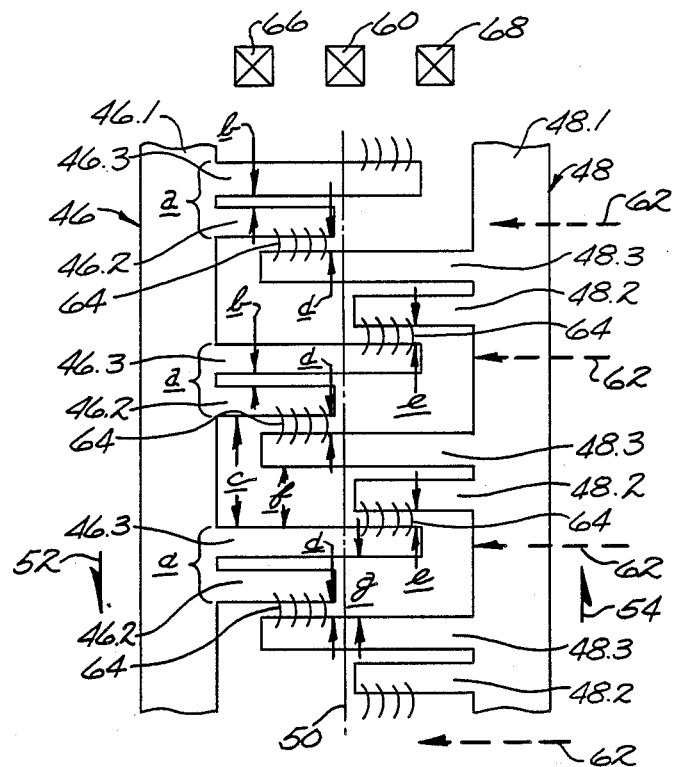
FIG. 3 is a developed view of the ferromagnetic elements of the device shown in FIGS. 1 and 2.

Preferably for example, as shown in the partial, developed view of the ferromagnetic elements 46, 48 in FIG. 3, a plurality of first element portions 46.2 of selected length are spaced around the periphery of the sleeve part 46.1 and a second plurality of other extending element portions 46.3 of relatively greater length are spaced around the periphery of the sleeve part in alternate relation to the extending portions 46.2. Pairs of those extending portions as indicated at a in FIG. 3 are disposed in relatively closely spaced, side-by-side relation as indicated at b and a relatively much greater spacing c is provided between adjacent pairs of the extending portions in each element. Corresponding element portions 48.2, 48.3 of corresponding lengths and spacings are provided on the other ferromagnetic element. In that arrangement, the extending portions of the elements are easily interleaved to provide the desired discontinuities or spacings at each side of the plane 50. That is, the distal ends of element portions 46.2 of the selected length are normally disposed in an overlapping or spaced side-by-side relation to the distal ends of element portions 48.3 of relatively greater length to provide discontinuities or close spacings d between pairs of those respective element portions at one side of the plane 50. Similarly, the distal ends of the element portions 46.3 and 48.2 provide discontinuities or spacings e between corresponding pairs of those respective element portions at the opposite side of the plane 50. The ferromagnetic elements are arranged so that the spacings d and e are initially equal but so that relative rotation of the ferromagnetic elements as indicated by the arrows 52 and 54 in FIG. 3 are adapted to increase the spacings e while decreasing the spacings d, the initial size of the spacing being selected to allow the degree of relative rotation of the members (such as 7°) as may be desired. The arrangement also provides that the other spacings f and g provided between extending portions of the ferromagnetic elements in each element are relatively much greater.

In a preferred embodiment, a pair of ring bearings 56 or the like, preferably formed of electrically conductive material such as a porous, lubricant-filled powdered brass compact or the like, are fitted closely around the respective ferromagnetic elements 46, 48. Preferably the elements have flanges 46.4, 48.4 for locating the bearings thereon. A bobbin 58, preferably formed of a relatively rigid electrically insulating and non-magnetic material such as a glass-filled resin or the like has a central bore 58.1 to fit closely around the ferromagnetic elements, and has counterbores 58.2 to receive the bearings 56 therein. The bobbin also has three circumferential grooves formed therein.

In accordance with the invention, a magnetic field exciting coil or primary transformer coil 60 is wound within the central one 58.3 of the bobbin grooves to be electrically energized for establishing a magnetic field in the ferromagnetic elements 46, 48, that field being sufficient to provide a substantial magnetic leakage flux at the locations of the discontinuities or spacings d and e between the pairs of element portions. In that regard, it is well known that when a magnetic field is established in a core member or the like, a certain degree of magnetic leakage flux is established adjacent the surfaces of the core members at the locations of any spaces or discontinuities in the core member surface, that magnetic leakage flux being proportional to or representative of the degree of discontinuity or size of the spacing. As such a magnetic leakage flux system is known and has been widely used or proposed for use in various types of discontinuity detecting systems and the like, it is not further described herein and it will be understood that when a magnetic field is established by the exciting coil in the ferromagnetic elements 46, 48 as indicated by the dotted arrows 62 in FIG. 3, the magnetic leakage flux occurring at the discontinuities d and e as indicated at 64 in FIG. 3 is proportional to or representative of the spacing at those locations. Accordingly, when the ferromagnetic elements 46, 48 are rotated relative to each other as described above, the magnetic flux leakage at d decreases as the spacing d decreases and increases at e as the spacing at e increases. Where that decrease or increase is large relative to the change in size of the discontinuity or spacing, there is a substantial change in the amount of leakage flux occurring at those locations.

A pair of sensing coils or secondary transformer coils 66, 68 are wound in a similar manner in the respective grooves 58.4, 58.5 on the bobbin to be disposed at positions aligned with the respective pairs of discontinuities or spaces at d and e. The sensing coils are magnetically coupled to the leakage flux occuring at the respective locations of the discontinuities or spacings d and e for providing output signals corresponding to the amount of magnetic leakage flux. In accordance with this invention, the sensing coils 66 and 68 are differentially connected for cooperating and providing an output signal which accordingly corresponds to the torque applied to the device 10 up to the predetermined applied torque as noted above.

Figure 5:
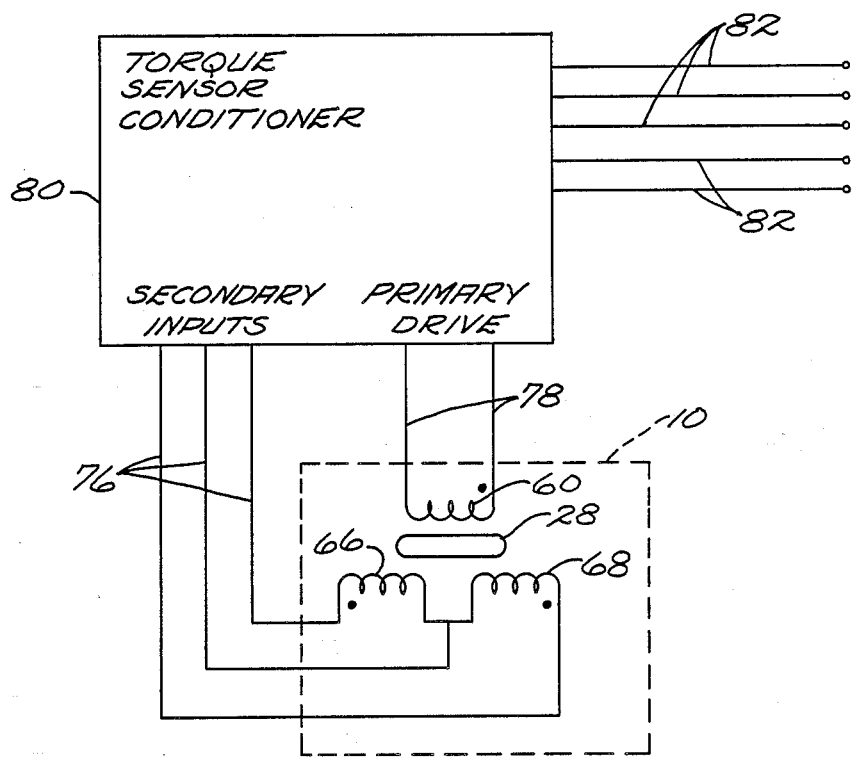
FIG. 5 is a schematic view illustrating use of the torque sensing device of the invention in an automotive power steering system.

In the preferred embodiment of the invention, a magnetic shield 70 of cold rolled steel or other magnetic material has an outer ring 70.1 overlying the outer surfaces of the coils 60, 66 and 68 and has end flanges 70.2 mounted in the bearings 56 as illustrated in FIGS. 1 and 2. In that arrangement the shield forms a housing which cooperates with the coils and with the ferromagnetic elements 46, 48 for establishing a low reluctance magnetic circuit path for the magnetic circuit indicated by the flux lines 62 in FIG. 3 and the housing also shields the coils from extraneous magnetic fields. Preferably the housing has an opening 70.3 for permitting leads from the coils to extend from the housing. In one preferred embodiment, terminals 72 are mounted in the bobbin and the coil leads are connected (not shown) to the terminals as may be desired. Preferably also, an adjustable tab 74 or the like is bent out of the housing material and is adapted to be moved toward or away from the coil 68 to adjust a null position of the device 10. Preferably as shown in FIG. 5, leads 76 from the sensing coils and leads 78 from the exciting coil extend to an output signal conditioner circuit of any conventional type such as an integrated circuit diagrammatically indicated at 80 in FIG. 5, thereby to provide an output signal as indicated at 82 in FIG. 5. The signal conditioning means 80 is adapted to be mounted on the device housing 70 as diagrammatically indicated at 70a in FIG. 2 or to be mounted on a separate support if desired.

In that arrangement, when the exciting coil 60 receives a driving pulse from the signal conditioner 80 to establish the magnetic field 62 when no torque is being applied to the vehicle steering shaft 14, the spacings d and e are equal. Accordingly, the output of the differentially connected sensing coils will be at a null position. However, as torque is applied to the vehicle steering shaft up to a predetermined torque level, the ferromagnetic elements 46 and 48 are rotated relative to each other so that the spacings between the ferromagnetic element portions at d and e change as noted above for providing a change in the magnetic leakage flux coupled to the respective sensing coils. The bearings 56 permit such relative rotation of the ferromagnetic elements while keeping the sensing coils accurately aligned with the discontinuites or spacings at the locations d and e. Accordingly, the differentially connected coils provide input to the circuit conditioner 80 to provide an output from the conditioner corresponding to the applied torque. The conductive sleeve 44 serves to effectively isolate the magnetic leakage flux occurrng at the spacings d and e from any ferromagnetic effects which may be due to discontinuities or the like on the surfaces of the torque bar 28 itself or on the lost motion splines or the like so that the change in flux occurring at the spacings d and e is accurately measured or detected by the sensing coils 66 and 68. Similarly the electrically conductive bearings 56 assure that there is no significant magnetic leakage flux occuring at the mounting of the shield 70 at the bearing location. When any additional torque is applied, the lost motion components 34, 36 engage and restrict further relative rotation of the torque member 28 to protect the member from damage while assuring that the additional torque is transmitted to the output shaft end of the device. The sensing device 10 is of compact, rugged and economical construction. Further it utilizes a very small number of components for providing the differential type of output so that the device is adapted to be easily and economically assembly with a high degree of accuracy, reliability and repeatability.

Figure 4:
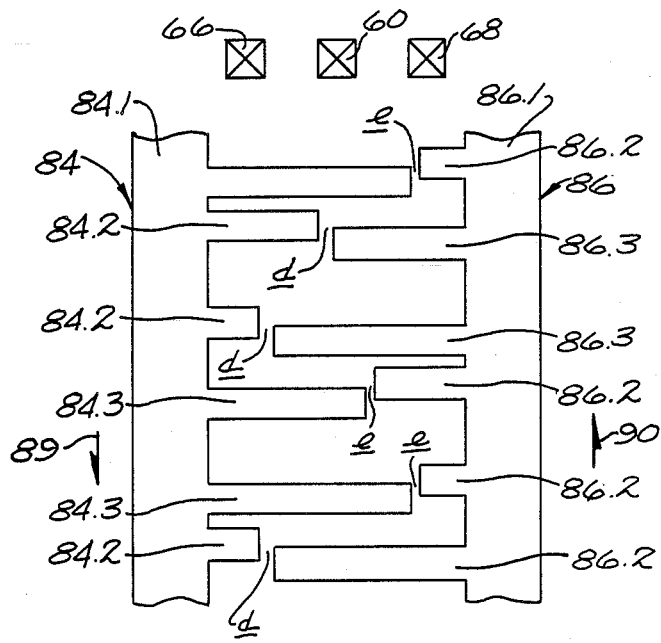
FIG. 4 is a developed view similar to FIG. 3 illustrating an alternate embodiment of the device of the invention.

In another alternative embodiment of the invention, the ferromagnetic elements 46, 48 are replaced by corresponding elements 84, 86 respectively. These ferromagnetic elements have a different arrangement of extending element portions as shown in FIG. 4. That is, the pair of element portions 84.2, 84.3 are arranged in one group of pairs 84a having the extending portions disposed in closely spaced relation to each and are also arranged in an alternate group of pairs 84b having a relatively greater spacing between the element portions. The extending portions of the other ferromagnetic element 86 have a corresponding arrangement of extending portions 86.2 and 86.3. The elements are then arranged so that pairs of the elements are partially aligned with each other at their tips to form discontinuities d' and e' at opposite sides of the plane 50. That is, the tips of the extending element portions are normally disposed to define discontinuities d' and e' therebetween which are substantially equal and the elements are adapted to be rotated relative to each other as indicated by the arrows 88 and 90 in FIG. 4 so that the tips become more aligned at d' to decrease the discontinuity at d' while the tips become less aligned at e' to increase the discontinuity at e'. In that arrangement, the magnetic leakage flux occurring at d' and e' also change in the manner previously described with reference to FIG. 3 for providing an output signal corresponding to the applied torque in a similar manner.

It should be understood that the torque sensing device of this invention is adapted to be made in a variety of ways within the scope of this invention. For example, various lost motion means are adapted to be used; the ferromagnetic elements, lost motion components, and torque transmitting member can be connected in a variety of different ways; the coils 60, 66 and 68 can be prepared and assembled in different ways; and various other means to mount the coils on the bobbin are also possible within the scope of this invention. It should be understood that this invention includes all modifications and equivalents of the described embodiments falling within the scope of the appended claims.

We claim:

1. A torque sensing device comprising a member having one end rotatable around a member axis relative to an opposite end of the member in response to an applied torque to an extent representative of the applied torque; a pair of ferromagnetic elements secured to respective member ends to be rotatable therewith, each element having a plurality of portions spaced around the member axis extending into interleaved relation with portions of the other element to form a plurality of pairs of the portions of the respective elements at each of two sides of a plane which extends transversely across the member axis between the ends of the member, the portions of the respective elements in each pair being normally disposed in a first closely spaced relation to each other to form a selected discontinuity therebetween and to be responsive to said relative rotation of the member ends to increase said discontinuity between the element portions in each pair at one side of the plane and decrease said discontinuity between the element portions in each pair at an opposite side of the plane; a magnetic field exciting coil for inducing magnetic leakage flux at said pairs of element portions representative of the discontinuity between the element portions in the pairs; and a pair of sensing coils disposed at respective sides of said plane coupled to the magnetic leakage flux at said pairs of the spaced element portions at the respective sides of said plane, the sensing coils being differentially connected to be responsive to said flux to provide an output signal corresponding to the applied torque.

2. A torque sensing device according to claim 1 wherein each ferromagnetic element has a first plurality of said extending portions of selected length spaced around the member axis and has a second plurality of said extending portions of relatively greater length spaced around the member axis in alternate relation to said first plurality of portions, the elements being disposed with said extending portions thereof interleaved with each other so that the extending portions of one element of said selected length cooperate with extending portions of the other element of said relatively greater length to form said plurality of pairs of element portions at one side of said plane and so that portions of said one element of said relatively greater length cooperate with portions of the other element of said selected length to form said plurality of pairs of element portions at the opposite side of said plane.

3. A torque sensing device according to claim 2 wherein the distal ends of the element portions in each of said pairs extend into partial overlapping relation to each other to define said discontinuities between overlapping distal ends of the extending element portions.

4. A torque sensing device comprising a torque transmitting member having one end rotatable around a member axis relative to an opposite end of the member in response to an applied torque to an extent representative of the applied torque; a pair of ferromagnetic elements secured to respective ends of the member to be rotatable therewith, each element having a plurality of portions spaced around the member axis extending into interleaved relation with corresponding portions of the other element to form a plurality of pairs of the portions of the respective elements at each of two sides of a plane extending transversely across the member axis between the ends of the member, the portions of the respective elements in each pair being normally disposed in a first closely spaced relation to each to be responsive to said relative rotation of the member ends to increase said spacing of the element portions in each pair at one side of the plane and decrease said spacing of the element portions in each pair at an opposite side of said plane; an exciting coil surrounding the elements to be energized for inducing magnetic leakage flux at said pairs of element portions representative of the spacing of the element portions in the pairs; and a pair of sensing coils disposed around the core elements at respective sides of said plane coupled to the magnetic leakage flux at said pairs of the spaced element portions at the respective sides of said plane, the sensing coils being differentially connected to provide an output signal corresponding to the applied torque.

5. A torque sensing device according to claim 4 wherein a first lost motion sleeve component is fitted around the member axis and secured to said one member end and a second lost motion sleeve component is fitted around the member axis and secured to the opposite member end, the lost motion sleeve components each having portions thereof extending along the member axis to be compactly accommodated inside the coils and to engage corresponding portions of the other lost motion sleeve components after predetermined relative rotation of the member ends in response to up to a predetermined applied torque for providing an output signal corresponding to said applied torque, the engagement of said portions of the lost motion sleeve components serving to transmit additional torque between the member ends when additional torque is applied while substantially restricting additional relative rotation of the member ends in response to said additional torque.

6. A torque sensing device according to claim 4 wherein each ferromagnetic element has a first plurality of said portions of selected length spaced around the member axis and has a second plurality of said portions of relatively greater length spaced around the member axis in alternate relation to said first plurality of portions, the elements being disposed with said portions thereof interleaved with each other so that portions of one element of said selected length cooperate with portions of the other element of said relatively greater length to form said plurality of pairs of element portions at one side of said plane and so that portions of said one element of said relatively greater length cooperate with portions of the other element of said selected length to form said plurality of pairs of element portions at the opposite side of the plane.

7. A torque sensing device according to claim 6 wherein the distal ends of the element portions in each of said pairs extend in partial overlapping relation to each other to define said spacing between overlapping parts of the distal ends of the element portions.

8. A torque sensing device comprising a torque transmitting member having one end rotatable around a member axis relative to an opposite end of the member in response to an applied torque to an extent representative of the applied torque; a pair of lost motion sleeve components fitted around the member axis and secured to respective member ends for rotation therewith, the lost motion sleeve components each having portions thereof extending along the member axis in overlying relation thereto to engage corresponding portions of the other lost motion sleeve component after predetermined relative rotation of the member ends in response to a predetermined applied torque to transmit additional torque between the member ends when additional torque is applied while substantially restricting additional relative rotation of the member ends; a pair of ferromagnetic elements each having a sleeve part fitted around and secured to a respective lost motion sleeve component for rotation therewith, each element having a first plurality of element portions of selected length and a second plurality of element portions of relatively greater length spaced around the member axis in alternate relation to each other and extending from the sleeve part along the member axis into interleaved relation with corresponding portions of the other element to form a plurality of pairs of portions of the respective elements at each of two sides of a plane which extends transversely across the member axis between the member ends, the portions of the respective elements in each pair being normally disposed in a first closely spaced relation to each other to be responsive to said relative rotation of the member ends to increase said spacing of the element portions in each pair at one side of said plane and to decrease said spacing of the element portions in each pair at an opposite side of said plane; a magnetic field exciting coil surrounding and compactly accommodating the extending portions of the elements and of the lost motion sleeve components within the exciting coil for inducing magnetic leakage flux at said pairs of element portions representative of the spacing between the element portions in the pairs; and a pair of sensing coils disposed around the extending portions of the elements and of the lost motion sleeve components at respective sides of said plane coupled to the magnetic leakage flux at said pairs of the spaced element portions at respective sides of the plane, the sensing coils being differentially connected to be responsive to said flux to provide an output signal corresponding to applied torque up to said predetermined applied torque.

9. A torque sensing device according to claim 8 having a bobbin disposed around the extending portions of the elements for mounting the exciting and sensing coils in closely spaced relation to the extending element portions, and having bearings disposed between ends of the bobbin and respective sleeve parts of the elements for mounting the bobbin on the elements while permitting said relative rotation of the member ends.

10. A torque sensing device according to claim 9 having a magnetic shield extending over the coils, the shield being mounted on the bearings for shielding the coils from extraneous magnetic fields.

11. A torque sensing device according to claim 10 wherein the bearings mounting the shield are electrically conductive for reducing the occurrence of magnetic leakage flux at the location of the shield mounting on the bearings.

12. A torque sensing device according to claim 11 having an electrically conductive sleeve disposed around the member axis between the extending portions of the lost motion sleeve components and the extending portions of the ferromagnetic elements.

* * * * *